2 Sheets—Sheet 2.
G. Warriner,
Furnace Grate.
N° 61,964. Patented Feb. 12, 1867.
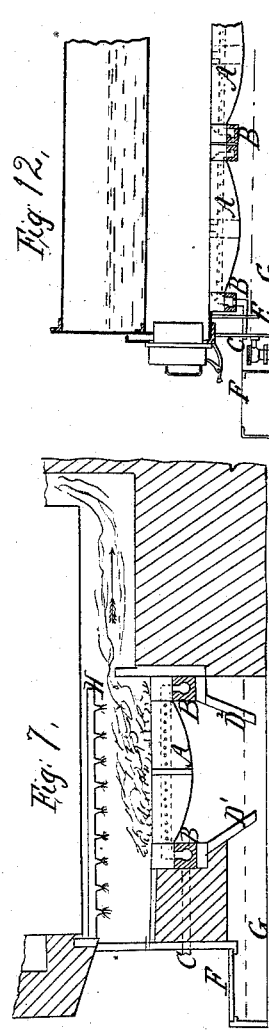
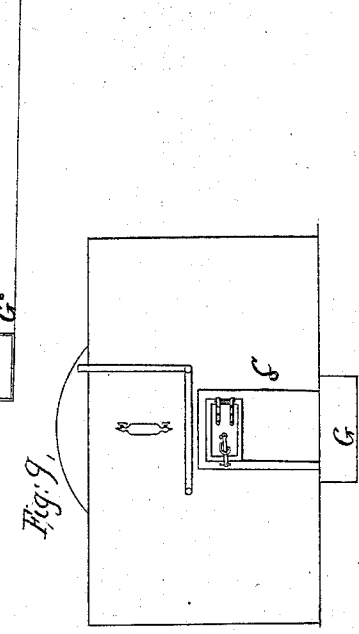
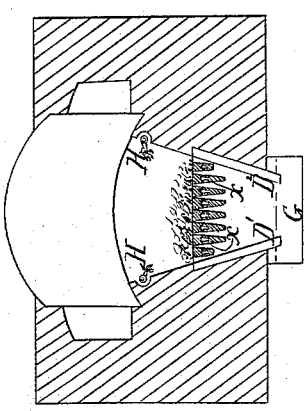
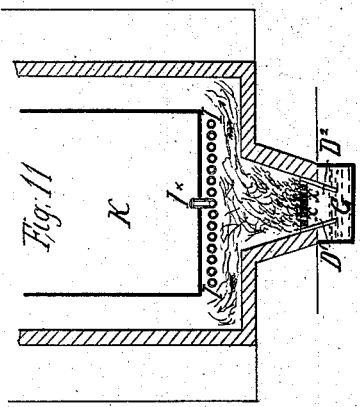
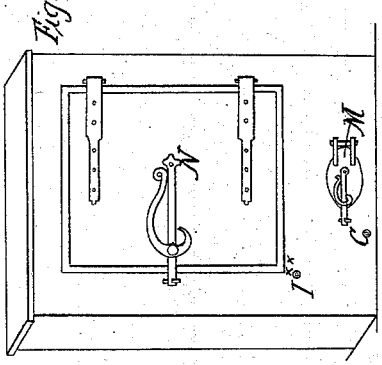
Witnesses:
Inventor
George Warriner 2 Sheets—Sheet 1.
G. Warriner,
Furnace Grate.
Nº 61,964. Patented Feb. 12, 1867.
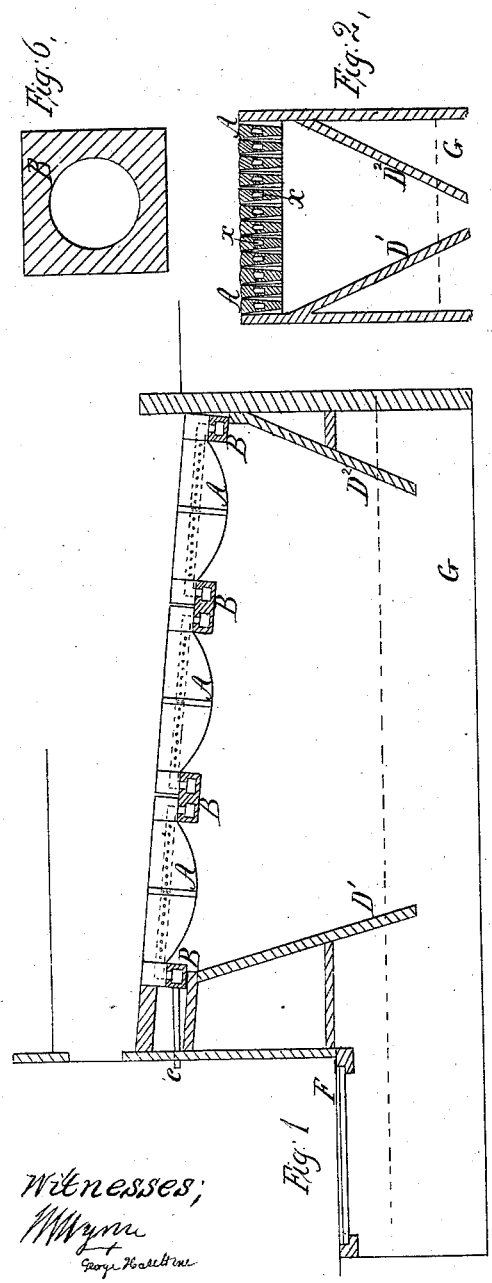
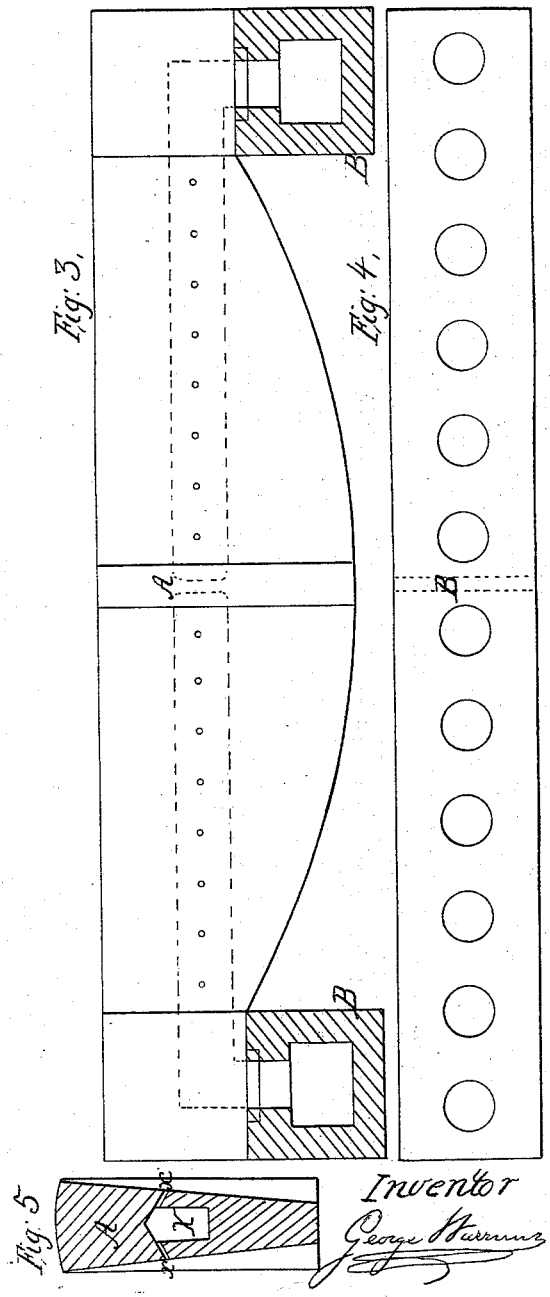

United States Patent Office.

GEORGE WARRINER, OF LITTLE ILFORD, ENGLAND.

Letters Patent No. 61,964, dated February 12, 1867.

IMPROVEMENT IN FURNACE AND FIRE-PLACE GRATES.

The Schedule referred to in these Letters Patent and making part of the same.

TO ALL WHOM IT MAY CONCERN:

Be it known that I, GEORGE WARRINER, of Little Ilford, in the county of Essex, England, have invented certain new and useful "Improvements in Furnaces and Fire-Places;" and I do hereby declare that the following is a full and exact description thereof, reference being had to the accompanying drawings, and the letters of reference marked thereon.

The nature of my invention consists in a novel construction and arrangement of the parts of furnaces and fire-places, whereby the consumption of fuel is economized and the heat therein is rendered capable of efficient control by means of peculiar arrangements of air-supplying pipes or passages, with cut-off mechanism, (such, for instance, as stop-cocks, taps, or valves,) enabling the operator to increase, diminish, or shut off the supply of air for keeping up combustion, as may be found desirable; air-proof "sealing" or closure in respect of all other parts of such fire-places or furnaces, except those capable of control as aforesaid, being also resorted to, as may be needful, and whereby inflammable gases, (or such other fluid or semi-fluid substances as are useful as fuel, or capable of augmenting the heating powers of the fuel, and capable of passage through pipes, tubes, or such like ducts,) may with facility be conveyed into the furnace or fire-place in order to the increase of heating powers; whereby, likewise, steam may be conveyed into the furnace to condense the smoke, and to secure more perfect combustion of the fuel; whereby, also, in the case of fire-places or furnaces provided with ovens, or such like cooking apparatus, food may be cooked in a manner much superior to that cooked in ordinary apparatus, such ovens being also useful as heating or drying-chambers.

Description of the Drawings.

Figure 1 is a longitudinal section of a furnace of a marine steam engine boiler with my invention applied and adapted thereto; the furnace or fire-bars in this case being in short lengths for convenience of removal when burnt away; the bearing bars fitting into slots in the fire-place being easily taken away when required.

Figure 2 is a transverse section of same arrangement.

Figure 3 is an elevation, on an enlarged scale, of a fire or furnace bar, supported upon two bearing bars. In this case the bearing bars differ somewhat from those shown in fig. 1, in respect of some of the bearing bars shown at fig 1 having two air-passages through one bearing bar, as will be seen on inspection of the drawings.

Figure 4 is a plan view of the bearing bar.

Figure 5 is a cross-section of a fire or furnace bar.

Figure 6 is a cross-section of a bearing bar.

Figure 7 is a longitudinal section of a furnace for a wagon boiler, with steam, gas, or petroleum supply pipes, shown above the furnace.

Figure 8 is a transverse section of the said furnace.

Figure 9 is a front elevation thereof.

Figure 10 is a front elevation of an oven, or cooking, heating, or drying-chamber, to which the furnace or fire-place improvements are applied.

Figure 11 is a transverse section of the same; and

Figure 12, longitudinal section of arrangements specially adapted for the furnaces of what are commonly designated "Cornish" boilers.

Like letters refer to corresponding parts in the several figures.

To enable others skilled in the art to make and use my invention, I will proceed to describe its construction and operation.

First. I construct my fire or furnace bars, A, hollow, as shown by the dotted lines in figs. 1, 3, 7, and 12, and by the mark × in figs. 2, 5, 8, and 11; and through these bars I admit the air, steam, or gas to the furnace to support combustion, they being connected with a hollow bearing bar or tube, as shown in the drawings at B in figs. 1, 3, 4, 6, 7, and 12. In some cases, however, where it is desired to adapt my invention to existing furnaces without removing the ordinary bars, I place tubes under such bars, and connect these tubes with a tube in front. These bars (or tubes running under the ordinary bars) are perforated with a number of small holes or slits, as shown by the small circles or dots at figs. 1, 3, 7, and 12, and at X X, fig. 5, through which the air, steam, or gas passes in subdivided streams into the fire. I consider it desirable that the furnace bars should be in the shape of the cross-section shown by the drawing, fig. 5, and that the perforations or slits should be in a line at the side of the bar, about one-third of its depth from the top of the bar, and should slant downwards, to prevent choking by the ashes. With a view to insure the greater durability of the furnace bars, I should prefer that they should be constructed in part of steel and in part of iron; that is to say, the bottom part of iron and the top, or fire surface of steel, the two parts being united by suitable connections, such as have already been introduced to public knowledge. As regards the practical construction of these hollow bars, I prefer to have the ends of the fire-bars drop into the orifices or passages in the bearing bar, as shown by the drawings; but in some cases, where this is impracticable, any other known method of connection may be adopted. The supply pipe or passage for air should be screwed and tapped into one of the bearing bars. I regulate the quantity of air, steam, or gas to be admitted by using a throttle-valve, or other valve, stop-cock, or tap, the same being placed in the air-supplying pipe or duct C, figs. 1, 7, and 12; one end of which is to be open to the external atmosphere, the other end opening into the hollow bearing bar B, or into the aforesaid hollow tube in front of the furnace when the independent air-tube arrangement is adopted. With the view that no air may be permitted to pass into the fire through any other opening than that controlled by the valve, stop-cock, or tap aforesaid, I place or construct under the bars an inverted hollow cone or pyramid, (see figs. 1, 2, 7, 8, and 11, at $D^1$ $D^2$,) and connect the same in an air-tight manner with the bottom of the furnace. In some cases a mere air-excluding screen or apron, as at E, fig. 12, will be sufficient. The bottom of such cone or pyramid being open, I place water or other liquid as an air "sealing" in the ash-pit beneath, the water or other liquid being maintained by any ordinary arrangement for supplying water, as, for instance, a ball-cock arranged at such a level as to be above the bottom edges of the said hollow cone or pyramid, or the bottom edge of the air-excluding screen or apron. I also use air-tight doors or covers (see F, figs. 1, 7, and 12) for the ash-pit, (G, figs. 1, 2, 7, 8, 9, 11, and 12,) and in all cases I use air-tight doors to the furnaces. In cases where it is impracticable to use the water "sealing," or desirable to dispense with it, it is obvious that care must particularly be taken to have all parts of the furnaces air-tight. In places where a sufficient supply of air is with difficulty obtained to support combustion, such as stoke-holes of steam vessels, mines, or other such like places, I would carry the supply pipe to the furnace up to the open air, and by this means a furnace can with facility be kept burning under water or below the surface of the earth, and in case of a steamship, were the sea to wash into the stoke-hole, the fire would not be extinguished. When it is desired to admit any inflammable gas, (such as carburetted hydrogen gas,) in order to increase the heat, I pass the same through a tube or tubes placed over or by the side of the fire, (as at H, figs. 7 and 8,) or underneath the fire, these tubes having a number of holes in them, into which are inserted nipples made of earthenware, stone, or other suitable mineral material. These tubes or pipes should, (near the point of supply, or where it may be found most convenient,) be provided with stop-cocks or valves for the purpose of regulating the supply. The same tubes may also be used for the purpose of admitting petroleum or other such like inflammable substances into the furnace. Steam can also be injected through these tubes over the fire to condense the smoke or other substances, to produce a vapor for use in various branches of manufacture; as, for instance, sulphuric acid to produce sulphurous gas for bleaching, or pyroligneous acid for curing meat and fish. It is obvious that, when thought necessary, the gas or petroleum, or other such like inflammable substance, to be passed through any of these tubes or pipes, may be driven in by the action of a fan or blower, or by pressure.

Second. In applying or adapting my improvements to furnaces or fire-places provided with ovens, or such like cooking apparatus, or heating or drying-chambers, besides (and with or without) the arrangements of hollow fire bars and tubes hereinbefore described, I also employ tubes or pipes fitted or placed over or by the side of the fire, (see I, fig. 11.) These tubes have an opening to the external air beyond the bounds of the furnace or fire-place, and a valve similar to the throttle-valve hereinbefore described with reference to the fire bars. I should construct these tubes either as a flat coil or a zig-zag system of pipes or tubes, or arrange them as a number of longitudinal tubes communicating with each other, or with two transverse tubes, having a communication with the external air. There must also be an opening into the oven or cooking chamber, or other place to be heated, to permit the heated air to pass into it. The more perfectly to heat the air in its passage through the tubes, I sometimes fill them with pieces of iron or steel, or iron or steel shavings. The hot air going into the oven carbonizes the exterior of the meat in process of cooking, thus producing osmazone, and imparting the flavor peculiar to roast meat. Figs. 10 and 11 show the exterior, and the section, of a small oven constructed of iron or fire-clay, the tubes being marked I and the oven K, the inlet for hot air into the oven being marked $I^\times$. The exterior view (fig. 10) shows at $I^{\times\times}$ the opening from the tubes to the external air; at C, the valve opening to the furnace bars; at M, the air-tight furnace doors; and at N, the oven door. The features of the construction shown by the accompanying drawings, and not hereinbefore specifically referred to, are not peculiar to my invention, as will readily be perceived by the practical man, hence I deem any particular mention of them unnecessary.

Before concluding this my specification of my invention, I would remark that it will be readily understood by any practical man, that, although I have shown by the drawings, and have herein referred to, certain specific forms and configurations of details of the mechanism, being such as I prefer to use, and recommend to be used, yet I could sometimes vary such form of details; and, in particular, I may state that the bearing bar shown as placed in front, might be placed at the side or in any other position, accordingly as may be desired.

What I claim as my invention, and desire to secure by Letters Patent, is—

The inverted cone or pyramid, or the air-excluding screen or apron, sealed at the bottom by water or other liquid, as herein set forth.

In combination with the above, I also claim hollow furnace or fire bars or tubes in conjunction with solid grate bars, connected with a hollow bearing bar or bars, whereby steam, air, or gas is introduced to support combustion, the introduction thereof being regulated by any convenient or suitable means, substantially as herein specified.

I also claim introducing petroleum, or other such like inflammable substance or gases, through tubes over, or by the side of, or underneath the fire, as hereinbefore stated.

I also claim the application or adaptation, in the manner hereinbefore described, of pipes or tubes in furnaces or fire-places, in immediate juxtaposition with ovens or other cooking apparatus or heating-chambers, which pipes or tubes admit heated air into the oven or other chamber to be heated.

GEORGE WARRINER.

Witnesses:
   W. W. WYNN,
   GEORGE HASELTINE, *International Patent Office, 8 Southampton Buildings, Chancery Lane, London.*